June 20, 1939.  P. M. CARTER ET AL  2,162,937
AUTOMOTIVE VEHICLE TRANSMISSION
Filed Aug. 22, 1935  4 Sheets-Sheet 1
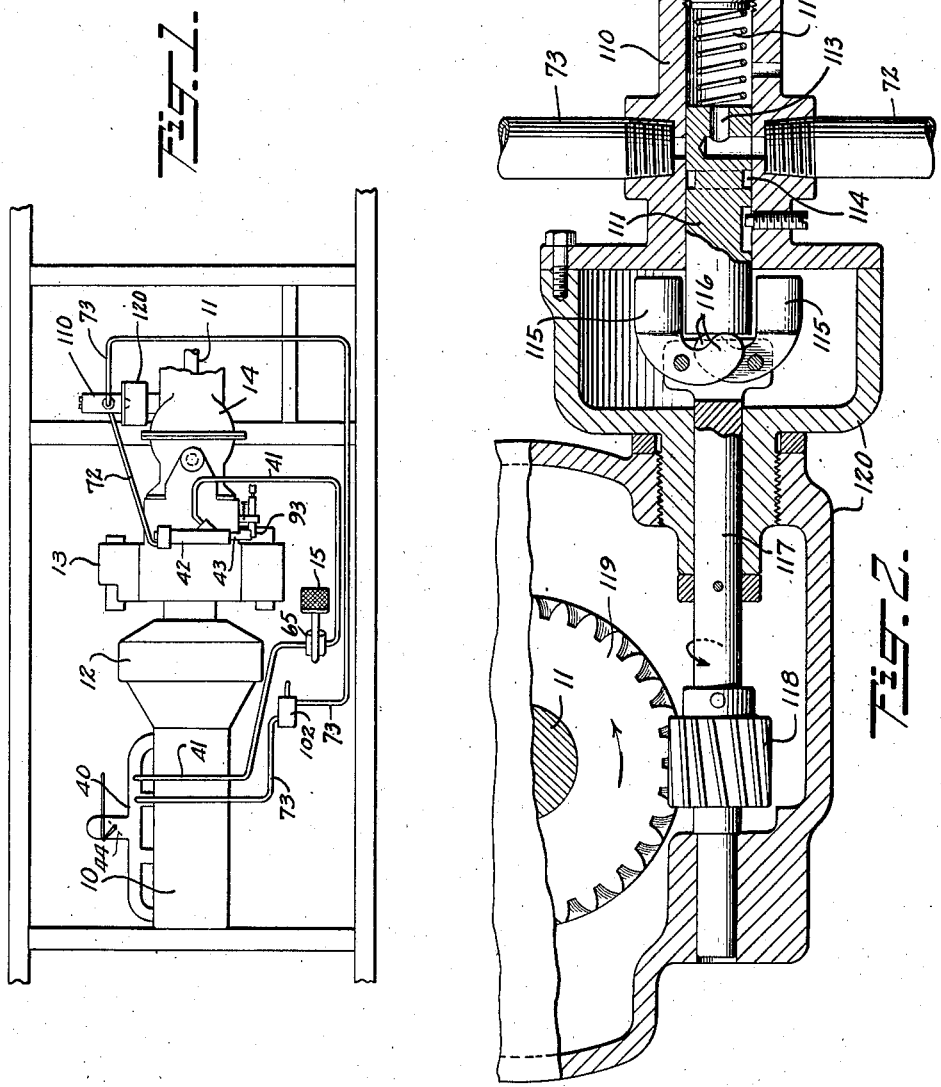
INVENTORS.
Philip M. Carter
Louis A. Larsen
BY
Morgan, Finnegan and Durham
ATTORNEYS.

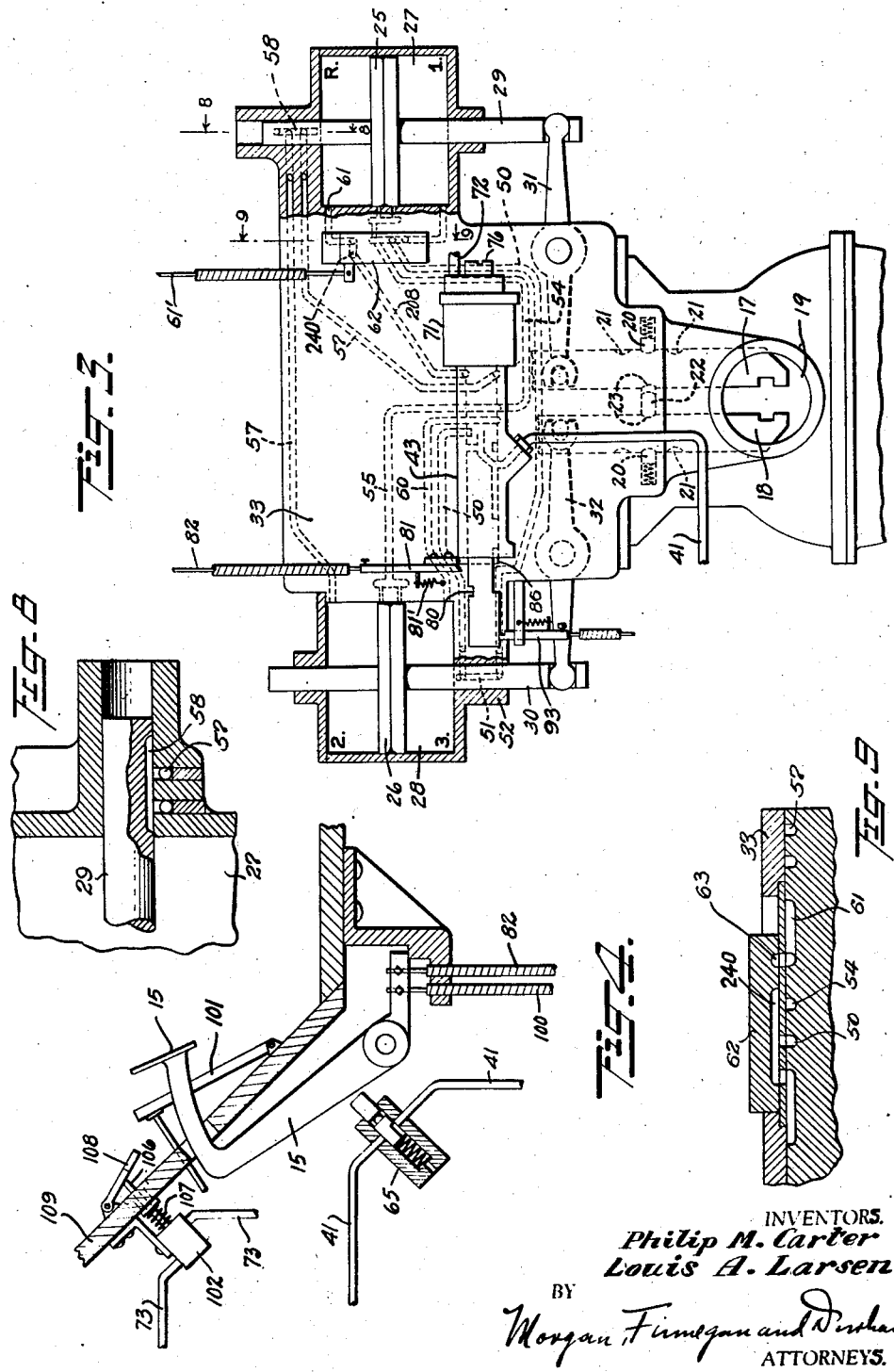

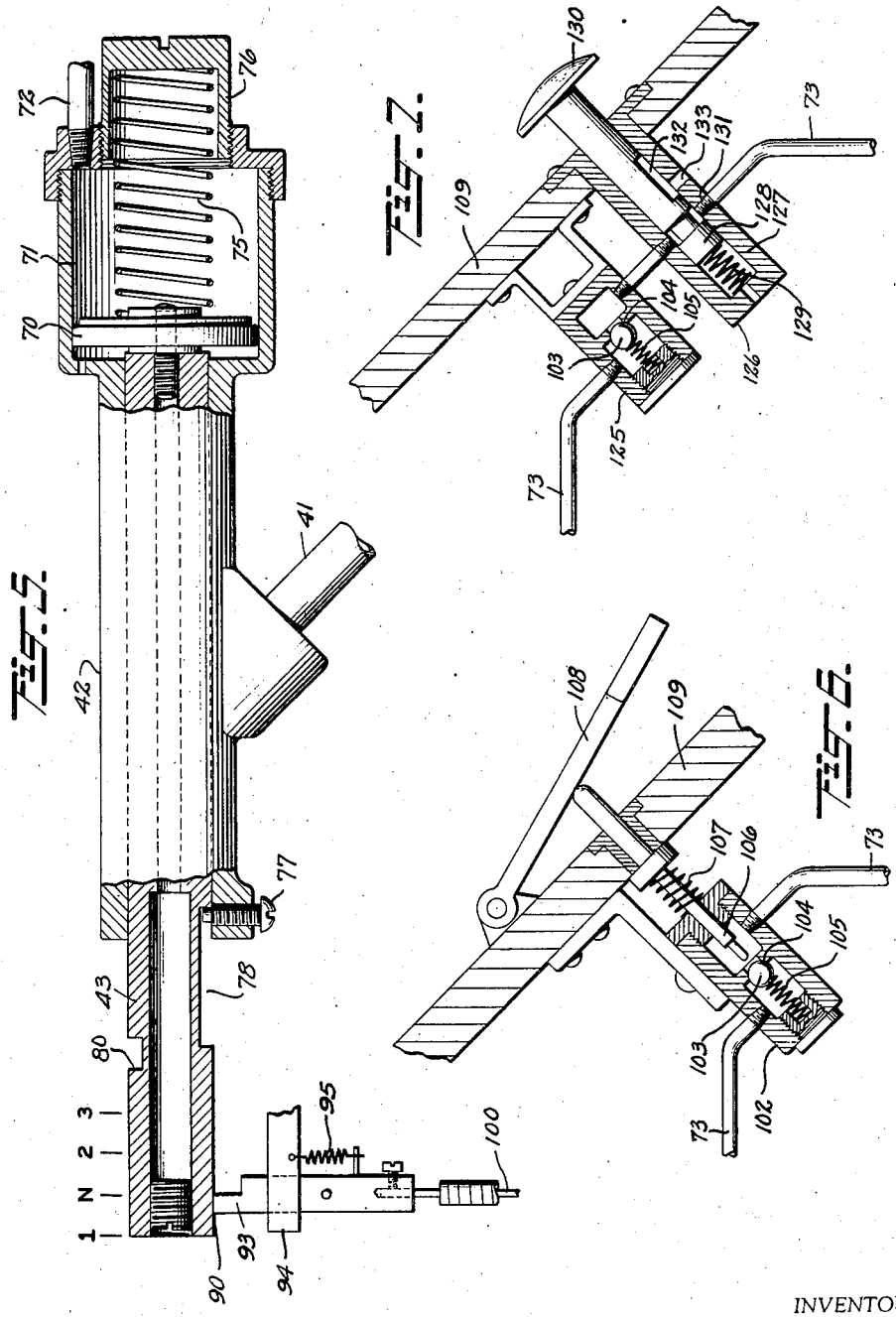

June 20, 1939.  P. M. CARTER ET AL  2,162,937
AUTOMOTIVE VEHICLE TRANSMISSION
Filed Aug. 22, 1935    4 Sheets-Sheet 4
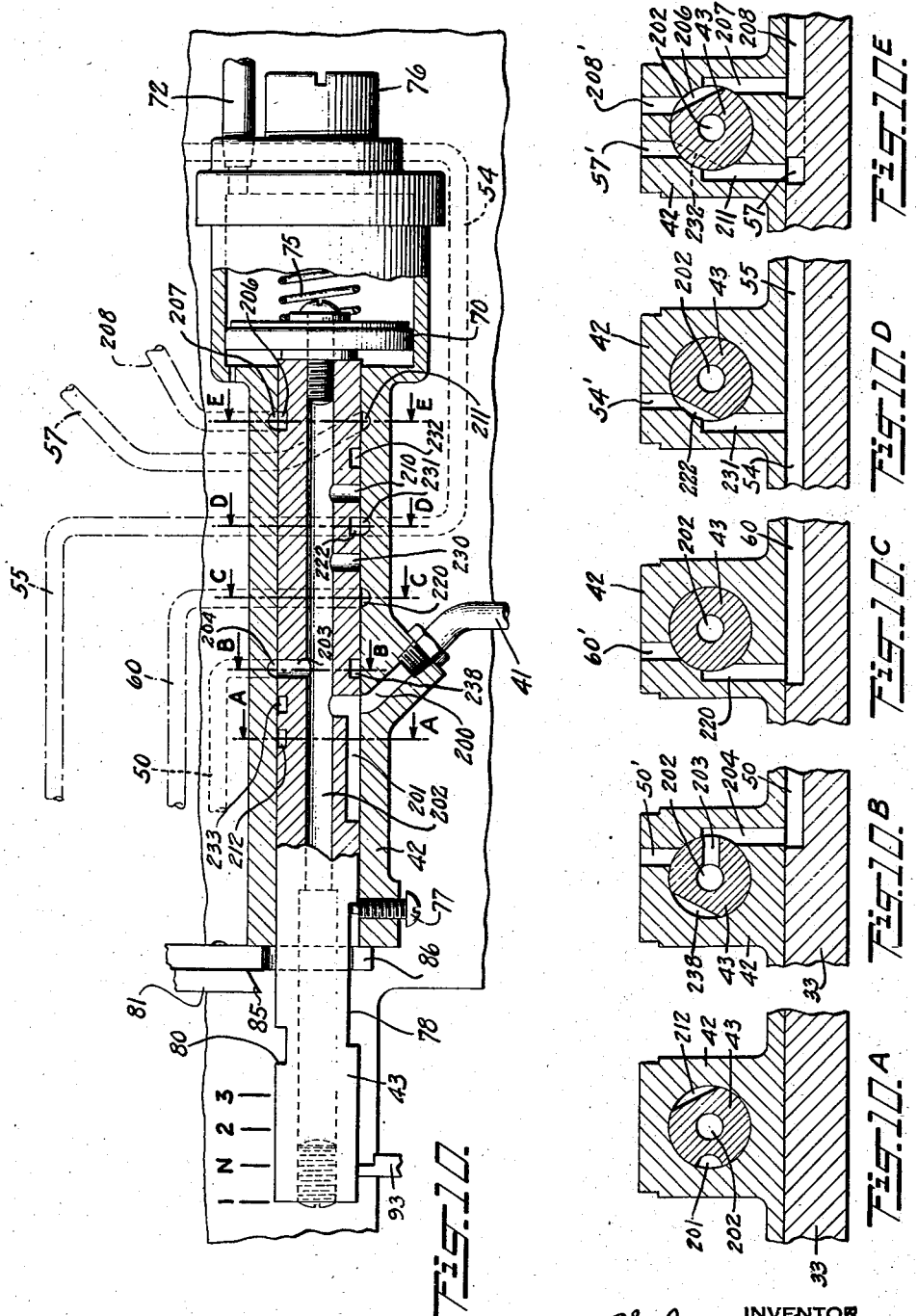
INVENTORS
P. M. Carter and L. A. Larsen
BY
Morgan, Finnegan and Durham
ATTORNEYS Patented June 20, 1939

2,162,937

UNITED STATES PATENT OFFICE 2,162,937

AUTOMOTIVE VEHICLE TRANSMISSION

Philip M. Carter, White Plains, and Louis A. Larsen, Brooklyn, N. Y., assignors to Vaco Products, Inc., a corporation of Delaware Application August 22, 1935, Serial No. 37,267

15 Claims. (Cl. 192—3.5)

The present invention relates to automotive vehicles and more particularly to a novel and improved fluid pressure operated transmission gear shifting device for use with such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a diagrammatic plan view showing the general arrangement of the present embodiment;

Figure 2 is a fragmentary cross section through a portion of control mechanism employed in the present embodiment;

Figure 3 is a plan view, with certain parts broken away, of the present embodiment of a gear shifting mechanism and control therefor;

Figure 4 is a diagrammatic vertical section of a clutch and accelerator pedal and the associated control devices;

Figure 5 is a detailed plan view, with certain parts broken away, of the selector valve shown in Figure 3;

Figures 6 and 7 are detailed sectional views of two forms of the control means for the selector valve; and Figure 8 is a fragmentary vertical section taken on the line 8—8 of Figure 3;

Figure 9 is a fragmentary detailed section taken on the line 9—9 of Figure 3;

Figure 10 is a detailed horizontal section of the selector valve; and

Figures 10a, 10b, 10c, 10d, and 10e are fragmentary detailed sectional views taken on the section lines A—A, B—B, C—C, D—D and E—E, respectively of Figure 10.

The present invention has for its object the provision of a novel and improved vacuum operated gear shifting device particularly adapted for shifting the transmission gears in an automotive vehicle from one speed ratio to another substantially automatically once the vehicle is set in motion and yet under substantially complete control of the operator. Another object of the invention is the provision of an improved vacuum operated gear shifting device for automotive vehicles in which the gear shifting operations are carried out upon declutching under control of a device which is controlled by motion of the vehicle but is not responsive to the varying speed thereof, said control device also serving to condition the shifting device for shifting into intermediate speeds. A further object is the provision of a simple and inexpensive vacuum operated gear shifting mechanism which is reliable in operation and in which the selector valve is urged with a force which is independent of vehicle speed from its position of rest by forward movement of the vehicle, and which force may be momentarily interrupted for shifting into an intermediate speed. In accordance with the illustrative embodiment of the invention, the automotive vehicle is provided with an internal combustion engine, a clutch, and selectively shiftable transmission gears through which power is transmitted from the engine to the traction wheels of the vehicle, all of the foregoing parts being of substantially conventional construction. Vacuum operated pistons are provided and suitably connected to the shiftable transmission gears to shift the gears from one speed ratio to another so that the vehicle may be operated in any of its forward speeds or in reverse, the vacuum being applied from the intake manifold of the engine to the pistons under control of the selector valve. Means are provided for constantly urging the selector valve to a normal position, and other means are provided for constantly urging the valve away from its normal position and against the first means whenever the vehicle is in motion in a forward. Means are provided for controlling the application of vacuum to the pistons so that gear shifting can occur only when the clutch is disengaged, and also for moving the selector valve away from its normal position to first speed position, as well as for permitting the valve to move from an intermediate speed position to high speed position after the vehicle has been set in motion and the gears have been shifted to the intermediate speed position. Thus, in the operation of the device, the clutch is disengaged while the vehicle is at rest, moving the selector valve to first speed position. As the car is set in motion by engagement of the clutch, the valve is moved to intermediate speed position and when the clutch is next disengaged, the gears are shifted to intermediate speed position and the valve is released permitting it to move to high speed position, and the gears are correspondingly shifted when the clutch is again disengaged. Optionally operable control means are provided for applying vaccum when the vehicle is substantially at rest to the piston corresponding to reverse speed. In accordance with the illustrative embodiment means are provided for momentarily interrupting the application of vacuum to the selector valve operating means for moving the selector valve to second speed position from its high speed positions regardless of the vehicle speed.

Vacuum operated means are provided for moving the selector valve from its normal position which it has while the vehicle is at rest, and these vacuum operated means may be controlled by various means which cause the application of vacuum to move the selector valve as soon as the vehicle has attained a slight forward speed. As an example of one suitable means for controlling the movement of the selector valve, a valve may be provided which is normally closed but is moved to open position by means sensitive to motion of the vehicle and not responsive to variable vehicle speeds, this valve being returned to its normal position when the vehicle is slowed to a very slow speed or is brought to rest.

The present embodiment is particularly adapted for use with the conventional type of transmission having one reverse and three forward speeds and is so shown and described.

It will be understood that the foregoing general description and the following detailed description as well, are exemplary and explanatory of the invention but are not restrictive thereof.

Referring now in detail to the illustrative embodiment of the invention as shown in the accompanying drawings, the present invention is shown as adapted for shifting the gears of a conventional type of three speed and reverse transmission in an automotive vehicle propelled by an internal combustion engine. As is usual, the internal combustion engine 10 is adapted to drive a propeller shift 11 through a clutch 12, a selective shiftable gear transmission 13 and a universal joint 14. A clutch pedal 15 is provided for operating the clutch.

The transmission unit 13 comprises the usual shiftable transmission gears which are moved into their respective speed positions by means of the gear shifting rods 17 and 18, slidably mounted in the transmission casing, and may be moved in case of emergency by means of a lever to be positioned in the lever socket 19 at the rear of the transmission. As shown, the transmission is designed to produce three forward speeds and one reverse speed, and the rod 17 is moved forward to place the gears in first speed position, or rearwardly for reverse, while rod 18 is moved reversely to place the gears in second speed or forwardly to place the gears in third speed position. Detent means are provided for centering the rods in their respective positions and for this position there are provided spring pressed plungers 20 cooperating with notches 21 in the sides of the rods 17 and 18. Interlock means are provided preventing movement of either of the rods 17 or 18 while the other rod is not in neutral or central position, and this means comprises a plunger 22 slidably mounted in the top of the casing positioned between the rods 17 and 18 and adapted to engage in one or the other of notches 23 while the other rod is moved away from its neutral position.

Power means are provided for moving the rods 17 and 18 to their several positions to shift the transmission gears and for this purpose vacuum operated pistons 25 and 26 are provided slidably mounted in their respective double ended cylinders 27 and 28, one at either side of the transmission casing, and having their piston rods projecting through the ends of the cylinders and tightly, yet slidably, mounted therein.

At their rear ends the piston rods 29 and 30 are connected to their respective rods 17 and 18 by means of levers 31 and 32 pivotally mounted on the upper surface of the plate 33 forming the cover for the transmission casing. Levers 31 and 32 are connected to the rods 17 and 18 by means of their forked ends 34 and the pins 35 projecting upwardly to and anchored in the rods 17 and 18.

Means are provided for applying vacuum selectively and individually to the cylinders 28 and 29 as required to shift the gears from one position to another and this vacuum is advantageously derived from the intake manifold 40 of the engine 10 having a throttle valve 44, and is applied to the gear shifting mechanism through a main supply line 41 which is connected to the casing 42 surrounding the slidable selector valve body 43. As will be more fully described, this valve determining which of the cylinder ends is subjected to vacuum to move one or the other of the pistons 25 or 26 in one direction or the other. The selector valve has four positions: First speed or reverse, neutral, second speed and third speed, and may be moved from one or the other of its positions to any other position to control the application of vacuum accordingly.

In its first speed position, the selector valve applies vacuum through line 50 to the rear face of piston 25, and this line is open from the selector valve to the cylinder 27 only when the piston 26 is in its neutral position, passing through the slide valve formed by the groove 51 in piston rod 30 where it passes through the boss 52 at the end of cylinder 28. Groove 51 is similar in construction to groove 58 shown in detail in Figure 8. Line 50 also passes through a reversing valve which will be described in connection with the reversing operation.

In its neutral position, the selector valve causes the application of vacuum from the manifold 40 to the lines 54 and 55 connected to the central portions of cylinders 27 and 28 respectively, and thereby tending to move both pistons to neutral position.

In second speed position, the selector valve causes the application of vacuum to the line 57 and thereby to the forward side of piston 26 provided the piston 25 is in its central or neutral position so as to open the slide valve 58 formed on the end of piston rod 29.

In high or third speed position, vacuum is applied through line to the rear side of the piston 26 to move it rearwardly.

The selector valve 43 is also provided with suitable venting apertures so that the cylinders are vented as the corresponding pistons are moved. Thus when the piston 26 is moving from second speed position to third speed position by the application of suction to the rear face of piston 26, the forward portion of the cylinder 28 is vented to atmosphere so that no resistance is offered to the movement of the piston.

The operation of the selector valve may be described in greater detail, as follows:

With the selector valve in its extreme left position as shown in Figure 10, suction is applied to the main port 200, through passageway 201 to the hollow interior 202 of valve 43, from which it is applied through port 203 to the port 204 forming the end of port 50. Simultaneously, air is admitted through ports 208' and 206 to port 207 forming the end of the reverse duct 208, and the difference in pressure thus established between the two faces of piston 25 causes the piston to move to its first speed position.

The selector valve, upon release of the latch 81 by clutch operation, is next moved by piston 70 to the position where its left hand end 90 is opposite the numeral "2" in Figure 10, and at this time suction is applied to ports 210 and 211, which are then in register, and is thus applied to duct 57 serving to return the piston 25 to neutral position and thereafter move the piston 26 to second speed position by the air which is admitted to the first speed end of the cylinder 27 and the third speed end of cylinder 28, through port 204 and venting port 212, this air being first admitted to the cylinder 27 through duct 50 and groove 51, and thereafter to the cylinder 28 as soon as the piston 26 has been moved from neutral position.

When the operator next depresses the clutch pedal, releasing latch 81, the piston 70 and valve 43 are moved to third speed position, with the valve end 90 opposite the figure "3" in Figure 10. In this position, suction is applied directly from the right-hand end of passageway 201 to port 220 which is the end of duct 60, and the suction is thereby applied to the third speed end of cylinder 28 and the piston 26 is moved by air admitted to the other end of cylinder 28 through duct 57, groove 58, port 211 and port 222 and venting port 57'.

For shifting the gears to neutral position from first or reverse, the valve 43 is positioned in neutral with its end 90 opposite the letter "N" in Figure 10 by movement of the push pull wire 61'. In this position, ports 230 and 231 are in register and suction is applied through port 230 to port 231 and thence to duct 55 which communicates with the central portion of both cylinders 27 and 28. During this movement air is admitted to the first speed end of the cylinder 27 through port 233 which is then in register with port 204 of duct 50, or if the reversing valve 62 is in reverse position, the reverse end of cylinder 27 is vented through venting ducts 50 and 61 and bridging groove 240 in the reversing valve slide 62. Vent 240' and duct 63 provide for venting the reverse end of the cylinder 27 with the selector valve in neutral position.

Venting port 232 vents the reverse end of cylinder 27 and the second speed end of cylinder 28, thereby admitting air when the gears are shifted to neutral from second speed.

For moving piston 25 to reverse position, a separate reversing valve is provided which may be manually moved from forward to reverse position by means of the push wire control 61'. This reversing valve comprises a slide valve body 62 which can be moved forwardly and when so moved connects the first speed line 50 with a line 61 communicating with the forward portion of cylinder 27 to apply vacuum to the forward side of the piston 25.

The various lines 50, 54, 55, 57 and 61 may conveniently be formed as ducts in the cover plate 33 and are so shown in the drawings.

Means are provided for controlling the application of vacuum to the gear shifter by the position of the clutch, and for this purpose a master valve 65 is provided in the line 41 between the intake manifold 10 and the gear shifter, this valve being positioned adjacent to the clutch pedal 15 and adapted to be opened only by movement of the clutch pedal to clutch disengaging position, thereby preventing shifting of the gears while power is being transmitted through the transmission.

Vacuum means are provided for urging the valve away from its normal position, as shown in Figure 3 and which corresponds to "neutral", towards second and third speed positions, and other means are provided for controlling this movement in accordance with a predetermined schedule so that the movement is controlled by other necessary operations, as for instance by disengagements of the clutch.

For this purpose, and as shown in Figure 5, the selector valve body 43 is connected at its right end to a piston 70 operating within a small cylinder 71 at the right hand end of the valve casing 42 and connected thereto. Vacuum may be applied, to move the valve body 43 and piston 70 to the right, through a pipe 72 connected to the intake manifold 10 and under control of a control valve so that vacuum is applied when the vehicle is set in motion.

Spring means are provided for urging the valve body to the left, towards neutral or first speed position, and for this purpose a spring 75 is compressed between the end of piston 70 and an adjusting screw 76 threaded into the end of the cylinder 71. Movement of the valve body 43 is limited by means of a set screw 77 threaded into the valve casing 42 and operating in a groove 78 formed in the valve body 43, also serving to hold the valve body against rotation.

Means are also provided for retaining the valve in second speed position while accelerating until the gears have been meshed in second speed position, thereby preventing unintentional skipping of second speed, and for this purpose valve body 43 is formed with a notch 80 which with groove 78 is adapted to cooperate with a releasable latch 81 mounted adjacent thereto. Latch 81 is normally urged towards the valve body and into the notch 80, but may be withdrawn therefrom by means of the pull wire control 82, one end of wire 82 being connected to the latch while the other end is connected to be moved by clutch pedal 15 as the clutch is disengaged. The valve-engaging end 85 of latch 81 is beveled so that movement of the valve body 43 to the left, as on stopping, is unimpeded, except by spring 81' which normally takes up the slack in the wire 82. When the clutch is disengaged the other end of latch 81 engages the end of groove 78 to hold the valve body 43 against movement by piston 70. The two ends 85 and 86 of latch 81 are so spaced that the valve 43 is only momentarily released as the clutch is engaged or disengaged. End 85 engages in notch 80 while the end 86 engages in groove 78 and the valve body 43 is held in second speed position by means of latch end 85 while the clutch is engaged or by end 86 while the clutch is disengaged, but momentarily in passing from disengaged to engaged position, the valve body 43 is free to move to third speed position.

Valve body 43 is formed with an end 90 adapted to engage a stop 93 which is reciprocably mounted in a guide 94 and resiliently urged against the valve end 90 by spring 95. Valve 43 is normally held in neutral position, but when it is desired to move the valve to first speed position (extreme left) the clutch pedal 15 is depressed causing plunger 93 to be retracted against the tension of spring 95 and thereby removing the interference of plunger 93 with the end 90 of valve body 43.

Plunger 93 may be connected with the clutch pedal 15 for operation by means of pull wire 100.

Means are provided for moving the valve to second speed and then to third speed positions when the vehicle has been set in motion, and for this purpose means are provided for controlling the application of vacuum to the piston 70. As embodied, there is provided a valve normally venting the line 72 when the vehicle is at rest, but causing suction to be applied thereto as soon as the vehicle has been set in motion or has attained a speed of from two to four miles per hour. This valve comprises a valve body 110 in which is slidably mounted a valve plunger 111 normally moved to venting position by means of a spring 112. Valve plunger 111 is provided with a vent 113 and a groove 114, groove 114 serving to connect lines 72 to line 73 which is, in turn, connected to the manifold 10. At one end of plunger 111 is provided a pair of small pivotally mounted weights 115, eccentrically mounted on shaft 117 and formed with cam toes 116 to engage and move plunger 111. As soon as the vehicle has been set in motion, the centrifugal force of weights 115 overpowers spring 112 moving the plunger 111 to open position. Drive shaft 117 is driven by worm gear 118 meshing with a worm 119 on the propeller shaft 11. A suitable casing and frame 120 is provided in which the shaft 117, weights 115 and plunger 111 are mounted and lubricated.

Means are provided for automatically returning the selector valve to second speed position from third speed position under certain conditions, as by opening the throttle of the engine, thereby permitting the gears to be shifted to second speed position on disengagement of the clutch. As embodied, means are also provided for preventing this action, except when desired, and a suitable control is positioned adjacent the accelerator pedal 101 to permit this operation to be easily accomplished.

As embodied, spring 75, line 72, valve 114 and line 73 are suitably proportioned so that, on opening of the throttle, the suction in the intake manifold is sufficiently reduced for a moment, and this reduced suction is transmitted to cylinder 71, allowing spring 75 to return the selector valve 43 to second speed position where it is held by latch 81 until the clutch is next disengaged, shifting the gears to second speed and also releasing latch 81.

Fig. 6 shows a detail of the control means normally preventing this automatic action and Fig. 7 shows an alternative or modified form of this control means, in Fig. 6 a releasable check valve is provided in the servo-vacuum line 73. Line 73 is divided and passes through the check valve 102 which comprises ball 103 urged against its seat 104 by spring 105 to block the seat opening, and released from its seat by means of plunger 106 which may be moved against the compression of spring 107 by the lever 108 pivotally mounted on floorboard 109 adjacent to the pedal 101. Ball 103 normally prevents release of the vacuum on piston 70, holding it and valve body 43 in high speed position, but on release of ball 103, accompanied by an opening of the throttle the suction on piston 70 is relieved, allowing spring 75 to move the valve to second speed position.

In Fig. 7 there is provided a positive release for the suction on piston 70. As embodied, the line 73 passes through both check valve 125 and relief valve 126, and the suction on piston 70 is normally held by the seating of ball 103 against its seat 104, and piston 70 is released by the venting of valve 126. Valve 126 comprises a valve body 127 in which is slidable a valve slide 128 held in open position by spring 129 and movable to venting position by pressure on the floor button 130. When depressed, the valve port 131 is connected through channel 132 to atmospheric port 133, relieving the suction on piston 70, and causing the valve body 43 to be moved to neutral position. Thereafter, if the clutch pedal 15 be depressed, while button 130 is still depressed, the spring 75 will move valve 43 to first speed position and cause shifting of the gears to first speed position, and on release of button 130 the valve will move to second speed position until the gears have been shifted to second speed. If the clutch pedal be depressed after button 130 has been released, the gears will be shifted to second speed position and thereby releasing latch 81 the valve 43 will move to high speed position.

In the operation of the described embodiment, the selector valve is in neutral position when the vehicle is at rest. As the operator depresses the clutch pedal, the selector valve is moved to first speed position and by engaging the clutch while opening the throttle, the vehicle is set in motion.

As soon as the vehicle is set in motion, the plunger 111 is moved to the right, opening valve 114 to apply vacuum to the end of piston 70 and moves the valve body 43 to second speed position where it is held by latch end 85 so long as the clutch is engaged. Upon disengaging the clutch, the valve 43 is still held in second speed position by latch end 86 and the gears are shifted to second speed by vacuum applied through valve 65 to the selector valve and the gears are shifted to second speed position, this disengagement of the clutch also permitting the selector valve 43 to move to third speed position as latch end 86 is moved out of groove 78 and before the latch end 85 is engaged in notch 80. Thereafter, the latch end 85 rides on the surface of the valve body 43. When the clutch is next disengaged, the vacuum will be applied to piston 26 to move the gears to third speed.

When the operator wishes to mesh the gears in second speed, as for greater power in climbing or for compression in descending a grade, the clutch pedal 15 is depressed, and the throttle suddenly opened while depressing button 130 or lever 108, moving the valve to second speed position by the force of the spring 75 and at the same time opening valve 65 to apply vacuum to the selector valve and through it to the forward end of piston 26.

As the vehicle is brought to rest, the thrust on plunger 111 is relieved, permitting the valve plunger 111 to move to the left, venting the cylinder 71 and returning the valve to neutral position, and as the clutch is disengaged vacuum is applied through the selector valve to move the pistons 25 and 26 to neutral position.

When it is desired to shift to reverse, the vehicle is brought to a stop, the reverse valve 62 is moved forwardly and vacuum is applied through the first speed-line to the reverse side of piston 25.

The invention in its broader aspects is not limited to the specific mechanisms shown and described but departures may be made therefrom within the scope of the accompanying claims without departing from the principles of the invention and without sacrificing its chief advantages.

What we claim is:

1. In an automotive vehicle including the combination of a selective gear transmission, a clutch through which power is applied to the transmission and means for engaging and disengaging the clutch, power operated means for selectively shifting the transmission gears, a selector controlling the application of power to said means, means controlled by the clutch engaging and disengaging means for controlling the application of power to the shifting means, a servomotor for moving said selector, means responsive to movement of the vehicle for controlling the application of power to the servomotor and manual means for interrupting the application of power to the servomotor.

2. In an automotive vehicle including the combination of a selective gear transmission, a source of fluid pressure, fluid pressure operated means for selectively shifting the transmission gears, a selector valve controlling the application of fluid pressure to said means, a fluid pressure operated servomotor for moving said valve, means responsive to movement of the vehicle for controlling the application of power to the servomotor, and means for interrupting the full application of fluid pressure from the source.

3. In an automotive vehicle including the combination of a selective gear transmission, a clutch through which power is applied to the transmission and means for engaging and disengaging the clutch, a source of fluid pressure, fluid pressure operated means for selectively shifting the transmission gears, a selector valve controlling the application of fluid pressure to said means, means controlled by the clutch engaging and disengaging means for controlling the application of fluid pressure to the shifting means, a servomotor operable on vehicle movement at a slow speed for moving said valve, means operated by the clutch engaging and disengaging means for permitting movement of the valve from one position to another and optionally operable means for preventing the application of power to the servomotor.

4. In an automotive vehicle including the combination of a selective gear transmission, a clutch through which power is applied to the transmission and means for engaging and disengaging the clutch, power operated means for selectively shifting the transmission gears, a selector controlling the application of power to said means, means controlled by the clutch engaging and disengaging means for controlling the application of power to the shifting means, a servomotor operable when the vehicle is moving at a slow speed for moving said selector, means operated concomitantly with the clutch engaging and disengaging means for permitting movement of the selector to an intermediate speed position, and optionally operable means for controlling the application of power to the servomotor.

5. In an automotive vehicle including the combination of a selective gear transmission, a clutch through which power is applied to the transmission and means for engaging and disengaging the clutch, a source of vacuum, vacuum operated means for selectively shifting the transmission gears, a selector valve controlling the application of vacuum to said means, means controlled by the clutch engaging and disengaging means for controlling the application of vacuum to the shifting means, a vacuum operated servomotor for moving said valve when the vehicle is set in motion at a slow speed, means for limiting movement of the selector valve, means operated by the clutch engaging and disengaging means for releasing said limiting means, means operated by the clutch engaging and disengaging means for permitting the movement of the valve from a neutral to a low speed position, optionally operated means operable independently of or concomitantly with the clutch engaging and disengaging means for moving the valve to an intermediate speed position by interruption of the vacuum applied to the servomotor and means responsive to movement of the vehicle at a slow speed for controlling the application of power to the servomotor.

6. In an automotive vehicle including the combination of a selective gear transmission, a clutch through which power is applied to the transmission and means for engaging and disengaging the clutch, a source of vacuum, vacuum operated means for selectively shifting the transmission gears, a selector valve controlling the application of vacuum to said means, means controlled by the clutch engaging and disengaging means for controlling the application of vacuum to the shifting means, a vacuum operated servomotor for moving said valve, means responsive to movement of the vehicle for controlling the application of vacuum to the servomotor, and an independently operable relief valve for interrupting the application of vacuum to the servomotor.

7. In an automotive vehicle including the combination of a selective gear transmission, a clutch through which power is applied to the transmission and means for engaging and disengaging the clutch, an engine having a throttle and a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means rendered operable by throttle operation for moving the valve from a high to an intermediate speed position, releasable means normally preventing such valve movement and means responsive to movement of the vehicle normally controlling the application of power to the servomotor.

8. In an automotive vehicle including the combination of a selective gear transmission, a clutch through which power is applied to the transmission and means for engaging and disengaging the clutch, an internal combustion engine having a throttle and a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means rendered operable by throttle operation for moving the valve to an intermediate speed position and means responsive to movement of the vehicle for controlling the application of power to the servomotor.

9. In an automotive vehicle including the combination of a selective gear transmission, a clutch through which power is applied to the transmission and means for engaging and disengaging the clutch, an internal combustion engine having a throttle and a source of vacuum, vacuum operated means for selectively shifting the transmission gears, a selector valve controlling the application of vacuum to said means, means controlled by the clutch engaging and disengaging means for controlling the application of vacuum to the shifting means, a servomotor for moving said valve, means for limiting movement of the selector valve, means for releasing said limiting means, means operated by the clutch engaging and disengaging means for permitting movement of the valve from a neutral to a low speed position, means for interrupting the application of power to the servomotor for moving the valve from a high to an intermediate speed position and means responsive to movement of the vehicle for controlling the application of power to the servomotor.

10. In an automotive vehicle the combination of a selective gear transmission, a clutch, means for engaging and disengaging the clutch, an engine driving the vehicle through the transmission and clutch, power means for shifting the transmission gears from one speed to another, a selector means controlling the application of power to the power means, power means for moving the selector means when the vehicle is in motion and means controlled by the clutch engaging and disengaging means operation for controlling movement of the selector means under influence of the power moving means, and means optionally operable independently of the clutch for interrupting the application of power to the selector moving means.

11. In an automotive vehicle the combination of a selective gear transmission, vacuum operated means for shifting the transmission gears from one speed to another, selector means controlling the application of vacuum to the shifting means, vacuum means for moving the selector means to several positions, means controlled by movement of the vehicle for applying vacuum to the selector moving means and means for interrupting the application of vacuum to the moving means.

12. In an automotive vehicle the combination of a selective gear transmission, fluid pressure means for shifting the transmission gears from one speed to another, a selector valve controlling the application of fluid pressure to the shifting means, fluid pressure means for moving the selector valve to its several positions, means controlled by the vehicle in motion for applying power to the selector valve moving means, and means associated with the engine throttle for controlling the application of power to the selector moving means.

13. In a fluid pressure operated gear shifter having a selector valve having several positions and controlling the application of fluid pressure to the shifter, a servomotor for moving the valve and actuated by fluid pressure when the vehicle is in motion, releasable means for holding the selector valve against movement to certain of its positions and optionally operable means for controlling the application of fluid pressure to the servomotor.

14. In a fluid pressure operated gear shifter having a selector valve, a servomotor for moving the valve and actuated by fluid pressure when the vehicle is in motion, a clutch, a valve opened on disengagement of the clutch, and controlling the application of power to the shifter through the selector valve and means for controlling the application of fluid pressure to the servomotor to move it from high to low and intermediate speed positions.

15. In a fluid presssure operated gear shifter having a selector valve, a servomotor for moving the valve and actuated by fluid presssure when the vehicle is in motion, a clutch, a valve opened on disengagement of the clutch, and controlling the application of power to the shifter through the selector valve, means for controlling the application of fluid pressure to the servomotor to move it from high to low and intermediate speed positions, clutch operating means and detent means released by operation of the clutch operating means for preventing movement of the valve from intermediate to high speed position until it is released.

PHILIP M. CARTER.
LOUIS A. LARSEN.